United States Patent [19]

Oelbermann

[11] Patent Number: 5,100,548
[45] Date of Patent: Mar. 31, 1992

[54] MEMBRANE PLATE FOR FILTER PRESSES

[75] Inventor: Max Oelbermann, Remscheid, Fed. Rep. of Germany

[73] Assignee: Rittershaus & Blecher GmbH, Wuppertal, Fed. Rep. of Germany

[21] Appl. No.: 621,983

[22] Filed: Dec. 4, 1990

[30] Foreign Application Priority Data

Dec. 29, 1989 [DE] Fed. Rep. of Germany ....... 3943259

[51] Int. Cl.$^5$ .............................................. B01D 25/21
[52] U.S. Cl. ..................................... 210/228; 210/230; 210/231; 210/232; 100/211; 100/295
[58] Field of Search ............... 210/224, 225, 231, 227, 210/228, 229, 230, 739, 232, 199, 202; 100/211, 199, 295

[56] References Cited

U.S. PATENT DOCUMENTS

| 2,024,955 | 7/1933 | Teatini . | |
| 4,166,035 | 8/1979 | Ramsteck | 210/231 |
| 4,508,623 | 4/1985 | Heckl et al. | 210/231 |
| 4,608,164 | 8/1986 | Neu | 210/231 |
| 4,666,596 | 5/1987 | Oelbermann | 210/228 |
| 4,749,482 | 6/1988 | Bonn | 210/231 |
| 4,764,273 | 8/1988 | Hinrich et al. | 210/225 |
| 4,776,955 | 10/1988 | Wildner | 210/229 |
| 4,781,829 | 11/1988 | Stanik | 210/231 |
| 4,826,593 | 5/1989 | Nev | 210/229 |
| 4,853,121 | 8/1989 | Heinrich et al. | 210/225 |
| 4,855,062 | 8/1989 | Oelbermann | 210/739 |
| 4,997,560 | 3/1991 | Häberle | 210/231 |
| 5,021,155 | 1/1991 | Stanik | 210/231 |

FOREIGN PATENT DOCUMENTS

| 0070473 | 7/1982 | European Pat. Off. . |
| 0125456 | 4/1984 | European Pat. Off. . |
| 2712753 | 9/1978 | Fed. Rep. of Germany . |
| 2933096 | 4/1987 | Fed. Rep. of Germany . |
| 3632932 | 7/1988 | Fed. Rep. of Germany . |
| 2585264 | 1/1987 | France . |
| 2589080 | 4/1987 | France . |

OTHER PUBLICATIONS

European Search Report EP 90 12 1364.

*Primary Examiner*—Robert A. Dawson
*Assistant Examiner*—Ana Fortuna
*Attorney, Agent, or Firm*—Antonelli, Terry, Stout & Kraus

[57] ABSTRACT

A membrane plate for filter presses including a supporting plate with a clamping rim elevated on both sides, a frame, and a membrane clamped in place between the supporting plate and the frame. The membrane is enclosed inwardly of the clamping rim between two approximately V-shaped diverging contact surfaces of the supporting plate and the frame and is capable of elastic deflection toward both sides of the membrane. To attain a high resistance to continuous stress, the membrane is provided inwardly of the clamping rim with a wavy or undulation zone wherein the undulation or wave crests extend in parallel to the clamping ring. At least one outer undulation or wave crest is enclosed between two contact surfaces, with this wave crest projecting with a back surface thereof into a flaring space defined by the contact surfaces lying in opposition to a pressure medium chamber of the filter press.

24 Claims, 6 Drawing Sheets

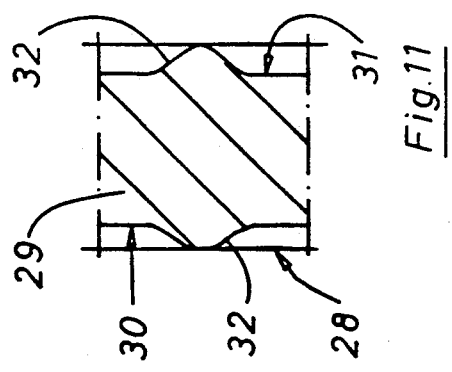
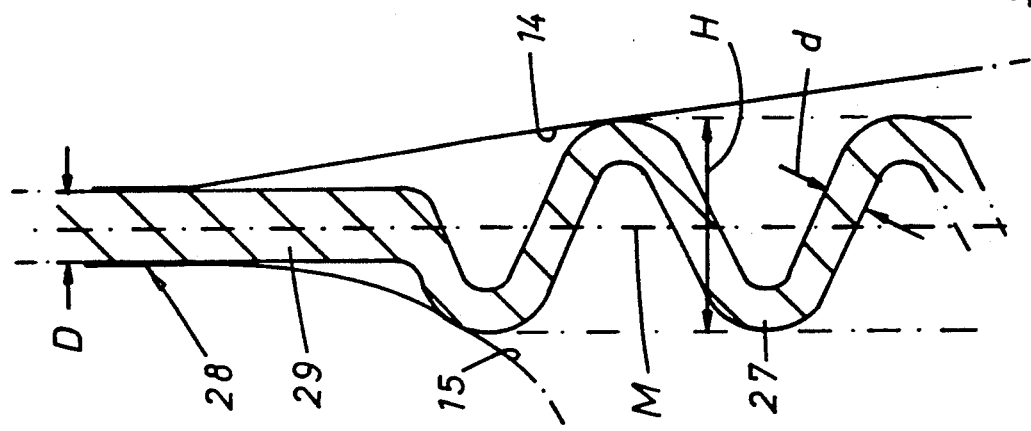
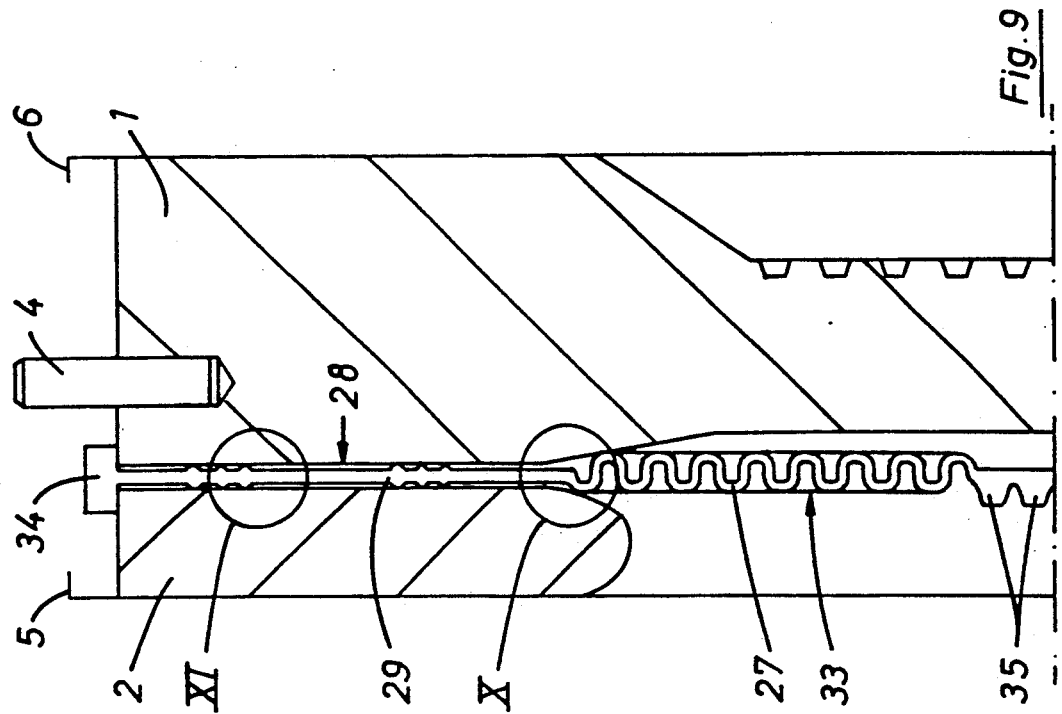

5,100,548

MEMBRANE PLATE FOR FILTER PRESSES

FIELD OF INVENTION

The present invention relates to a membrane plate for filter presses including a supporting plate, a frame, and a membrane clamped in place between the supporting plate and the frame, with the membrane being enclosed inwardly of a clamping rim between two acutely angled mutually inclined approximately V-shaped diverging contact surfaces of the supporting plate and frame, and with the membrane being capable of elastic deflection toward both sides of the frame.

BACKGROUND OF THE INVENTION

Chamber filter presses, filter plate regulating arrangements, membrane plates, and filter guide arrangements have been proposed in, for example, U.S. Pat. No. 4,686,596 and corresponding European patent 0 125 456, as well as in U.S. Pat. Nos. 4,853,121, 4,855,062, and 4,764,273.

Additionally, in German patent 2,933,096, with a membrane plate being a planar membrane fashioned as a rubber cloth nd including a relatively soft-elastic material so that the membrane may follow the directions alternatingly caused by the filtration pressure and pressure of the press without the danger of tearing at the clamping rim.

One difficulty in the above proposed membrane plate resides in the fact that, during the deflections, considerable tensile stresses occur within the membrane and, with soft-elastic membranes, such tensile stresses results in the creep of the material in the zone of the clamping rim, which creep is cumulative with each deflection. Consequently, leakages ultimately develop within the region of the clamping rim.

In European patents 70,473 and 125,456, it is also proposed to provide, for the membrane plates, a clearance for movement between the frame and the supporting plates so that the membrane is lifted at the clamping rim with each opening of the filter press, and with the membrane, in each case, being restored with regard to the material creep so that the deleterious cumulative effect of the creep is eliminated.

However, a disadvantage of the last mentioned proposed membrane construction resides in the fact that the soft-elastic membranes are highly susceptible to corrosion when exposed to aggressive media such as, for example, a filtering material that contains sulfuric acid. Thus, with such an arrangement, in industrial applications, the service life of the filter presses is substantially reduced.

While hard-elastic membrane plates of suitable synthetic resin materials may be utilized which are resistant to corrosion a disadvantage of this approach resides in the fact that the hard-elastic membrane plates can only execute a very limited deflection movement. Moreover, there is an additional danger that the hard-elastic membrane plates may tear or rupture along the clamping rim. However, for economical usage of filter presses, it is considerably important to be able to provide a maximally large filter cake space which perforce requires broad deflection paths for the membranes.

In, for example, DOS 2,712,753, filter press membranes are provided which are formed integrally at a relatively thick peripheral frame and are in contact with a supporting plate almost over an entire area thereof on a side of the press medium chamber so that the membrane plates can be deflected substantially only toward one side of the basic position. Consequently, with such an arrangement, only half-size filter cake chambers may be provided or, alternatively, the membrane must be adapted to execute, with the filter cake chamber being the same size, twice as wide a deflection path toward one side. In order to reduce internal tensile stress on the membrane during such deflection, an undulating membrane region is provided, with the region adjoining the frame, and the waves or undulations in the region are flattened upon a deflection of the membrane.

With an undulating membrane, considerable transverse forces occur at the clamping rim at the particularly critical stress exerted by the press medium pressure, since, at this rim, the wave or undulation crest must execute a wide deflection path prior to finding support, if at all, on a compressed filter cake. Moreover, the external undulations or wave crests execute a strong pivotal motion oriented or directed toward the rim so that crease formation can occur in the filter cloth in contact with the wave or undulation crest resulting in a premature wear of the filter cloths.

SUMMARY OF THE INVENTION

The aim underlying the present invention essentially resides in providing a membrane plate usable for large filter cake chambers as well as for aggressive filter media which avoids if not minimizes any danger of tearing off of the membrane after a number of deflection movements by the membrane and which insures a long service life for the membrane.

In accordance with the present invention, with a membrane plate of the aforementioned type, the membrane is provided with a wavy or undulated zone inwardly of the clamping rim, with the wave or undulation crests extending in parallel to the clamping rim. At least one outer wave or undulation crest is enclosed between both contact surfaces and projects with a back thereof into a flaring space defined by a contact surface lying in opposition to the press medium chamber. Advantageously, the outer undulation or wave crest may be in contact with the back thereof directly with the contact surface on the frame side.

By virtue of the above noted features of the present invention, the tensile forces which occur during a deflection of the membrane are limited to a value determined by the spring characteristic of the undulated or wavy membrane zones so that no critical tensile forces can occur at the clamping rim.

Additionally, yet a further decisive advantage of the present invention resides in the fact that the transverse forces oriented toward deflection of the membrane are distributed over a broad region and are absorbed, most extensively in an area directly adjoining the clamping rim or, if the undulation or wave crest are already in contact with the contact surfaces in a basic position, completely by the contact surfaces. The undulation or wave crests lying between the contact surfaces are already somewhat flattened when pressure is exerted on the membrane even if the undulation or wave crests are initially in contact with the contact surfaces thereby contributing toward a distributing of the forces over a larger area. However, with the arrangement of the present invention, it is insured that the membrane, in a transitional zone inwardly adjoining directly the clamping rim, no transverse stresses or a minimum transverse stress is experienced. In this connection, in fatigue tests, it has been experimentally determined that the membrane of the present invention can withstand, without damage, more than ten thousand deflection motions.

In accordance with further advantageous features of the present invention, a supporting plate is provided which includes supporting nubs on a surface thereof, with the membrane also being provided with undulating or wavy zones inwardly of the supporting nub contact surface so that even at these critical points, overstressing of the membrane during alternating deflection movements thereof is safely prevented.

Advantageously, in accordance with the present invention, the membrane is made of a polypropylene and has a Shore hardness of D 73.

In order to ensure a tight clamped mounting along the rim even with the utilization of a hard membrane, it is possible in accordance with the present invention to equip the membrane with peripheral grooves on both sides of a clamping rim, with the grooves being separated from each other by narrow sealing lips offset with respect to one another in a staggered fashion on the respective two sides of the membrane.

In accordance with the present invention, a height of the undulation or wave is larger than a thickness of the clamping rim of the membrane, and, advantageously, the height is approximately equal to a thickness of the membrane in a central zone provided with nubs.

The wave crests facing the supporting plate, in accordance with the present invention, lie in a plane of the clamping surface of the membrane on the supporting plate side, with the wave crest facing the frame projecting by one-third to one-half a thickness of the membrane clamping ring beyond the clamping surface of the membrane on the frame side.

The undulation of the membrane may be sinusoidal or substantially rectangular and the undulation or wave crests may be respectively interrupted at several peripheral sites or zones of the membrane by thin membrane zones which are substantially flat for enabling a discharge of filtrate.

The membrane plates in accordance with the present invention may have a rectangular configuration and, in corner regions thereof, a larger number of undulations or waves may be provided, with the number of undulations or waves decreasing in a step wise manner toward a lateral center of the membrane plates.

Advantageously, the undulations or wave crests may symmetrically project toward both sides beyond a central plane defined by the clamping rim and the membrane.

In accordance with still further features of the present invention, a thickness of the material of the membrane at the clamping rim may, for example, be one and a half times as large as a material thickness of the membrane in the undulate zone.

The clamping rim may, in accordance with the present invention, include a flat membrane strip provided on both clamping surfaces with mutually opposed sealing lips and/or may be provided with a continuously extending outer bead with a width of the bead being approximately equal to a height of the undulated zone.

The above and other objects, features, and advantages of the present invention will become more apparent from the following description when taken in connection with the accompanying drawings which show, for the purpose of illustration only, two embodiments in accordance with the present invention.

BRIEF DESCRIPTION OF THE DRAWINGS

FIG. 9 is a schematic partial cross-sectional view of another embodiment of a membrane plate constructed in accordance with the present invention;

FIG. 10 is a schematic cross-sectional view, on an enlarged scale, of the area or zone designated by the reference numeral X in FIG. 9; and FIG. 11 is a partial schematic view, on an enlarged scale, of the region or area designated by the reference numeral XI in FIG. 9.

DETAILED DESCRIPTION

Figure 1:
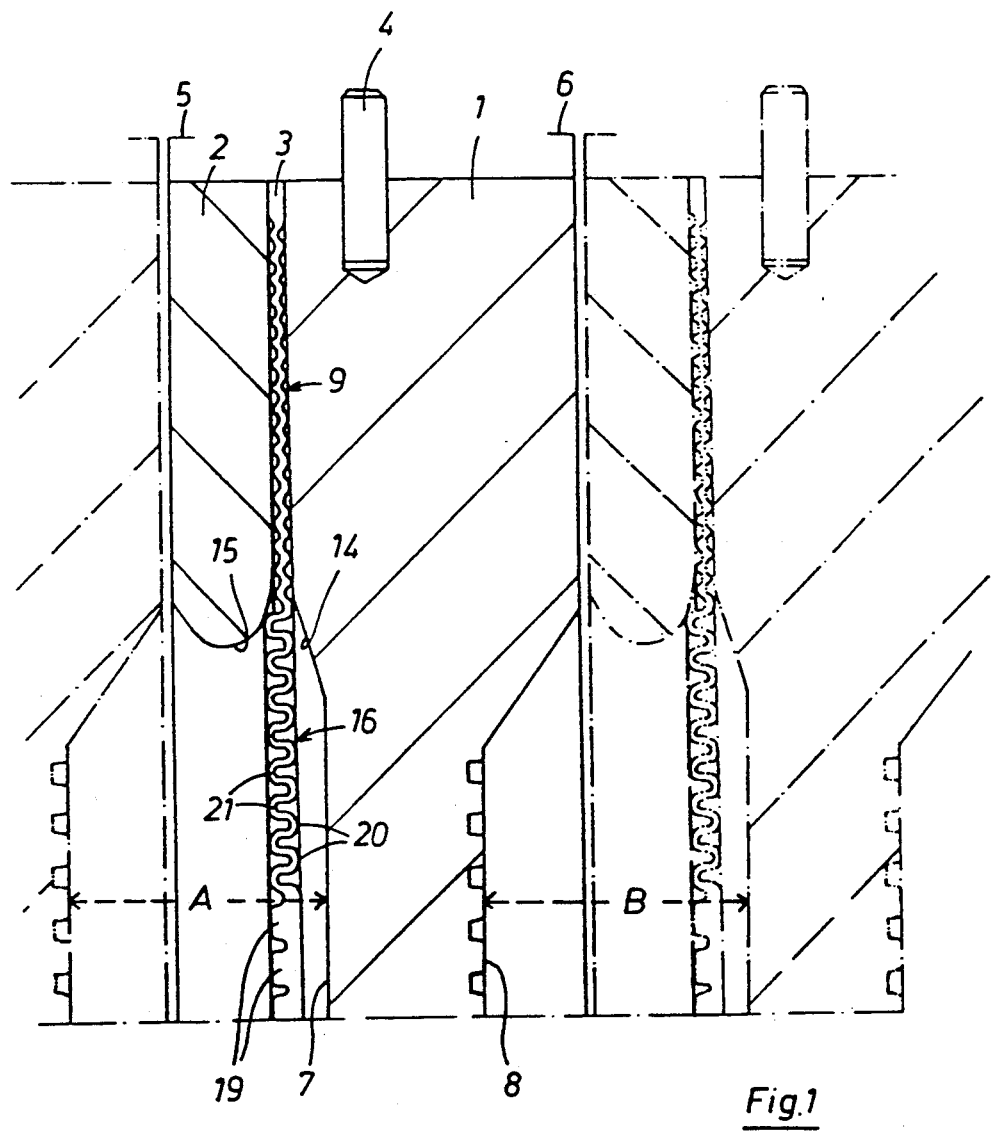
FIG. 1 is a schematic vertical cross-sectional view of a marginal zone of a membrane plate constructed in accordance with the present invention.

Referring now to the drawings wherein like reference numerals are used throughout the various views to designate like parts, and, more particularly, to FIG. 1, according to this figure, a membrane 3 for a filter press (not shown) includes a supporting plate and an all-around frame 2, with the membrane 3 being clamped in place between a supporting plate 1 and the frame 2. The membrane 3 is made of a relatively hard synthetic resin material, such as, for example, polypropylene. The supporting plate 1 carries, at an upper rim thereof, projecting pins 4 serving to enable an attachment of two filter cloths 5, 6 for covering the membrane 3 on both sides thereof. In order to obtain a maximally large filter cake space and/or maximally large filter chambers, the clamping rim of the supporting plate protrudes on both sides in a raised fashion beyond two inner panel surfaces 7, 8 of the supporting plate 1. As shown in phantom lines in FIG. 1, when a plurality of membrane plates 1 are utilized and are disposed proximate in the filter plate pack, the transverse dimension of the filter chambers A, B is substantially determined by a thickness of the frame 2 and the bilateral marginal beads of the supporting plate 1. Consequently, the membrane 3 can be deflected toward both sides of the filter chambers A, B.

Figure 2:
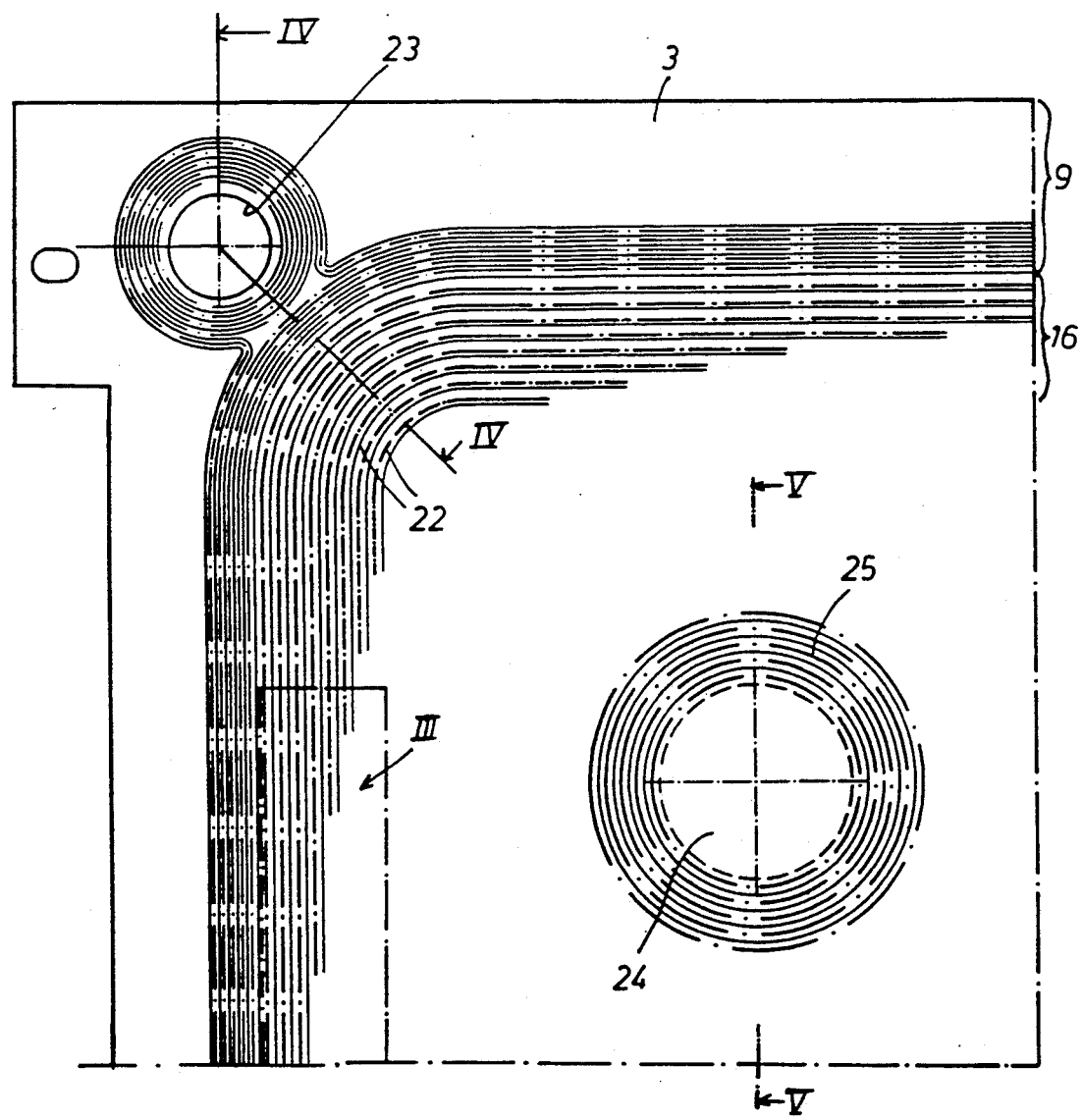
FIG. 2 is a top quadrant view of the membrane plate of FIG. 1.
Figure 4:
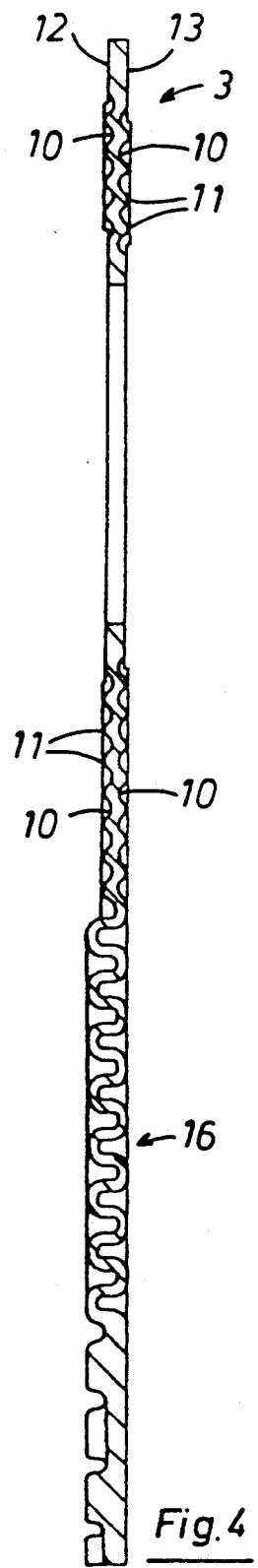
FIG. 4 is a cross-sectional view taken along the line of IV—IV in FIG. 2.

A clamping rim generally designated by the reference numeral 9 of the membrane 3, as shown most clearly in FIGS. 2 and 4, is provided on both sides with peripheral grooves 10 separated from each other by narrow sealing lips offset with respect to each other in a staggered fashion on both sides of the membrane 3, with the sealing lips 11 projecting beyond the clamping surfaces 12, 13 of the outermost smooth-walled rim of the membrane 3 to such an extent that a perfect seal is obtained when clamping the membrane 3 between the supporting plate 1 and the frame 2.

Figure 3:
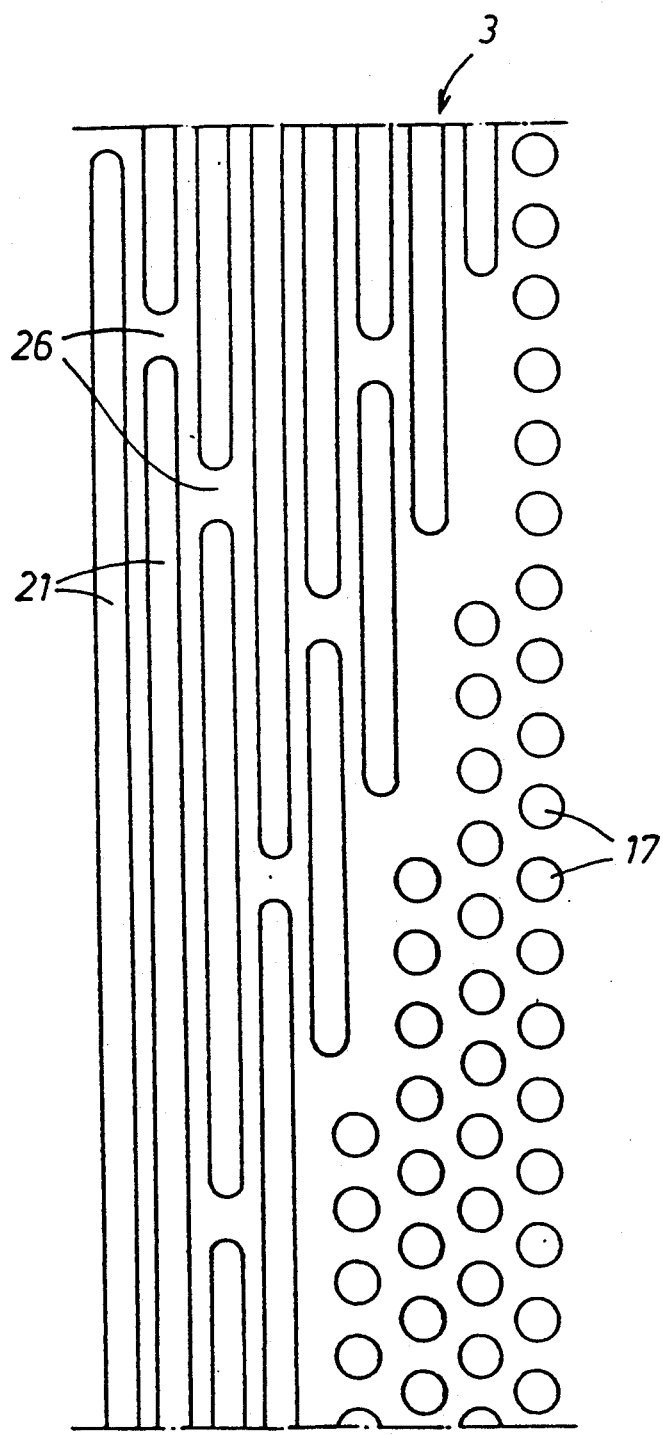
FIG. 3 is a schematic view, on an enlarged scale, of the membrane of FIG. 1 taken in the zone or area designated in III in FIG. 2.

The membrane 3, inwardly of the clamping rim 9, is initially enclosed for a predetermined distance between approximately V-like divergent surfaces 14, 15 respectively provided on the supporting plate 1 and frame 2, with the surfaces 14, 15 being inclined at an acute angle toward each other in a direction toward the outer rim of the membrane 3. The membrane 3 is also provided, inwardly of the clamping rim 9, with an undulated or wavy zone 16 extending into a base of gusset of the two contacts surfaces 14, 15, which surfaces are respectively inclined away from each other with respect to a primary plane of the filter plate. The undulated or wavy zone 16 is followed in an inward direction by a main region of the membrane provided with filtrate discharge nubs 17 (FIG. 3). The wave crests of the undulated zone 16 extend in parallel to the clamping rim 9.

Figure 6:
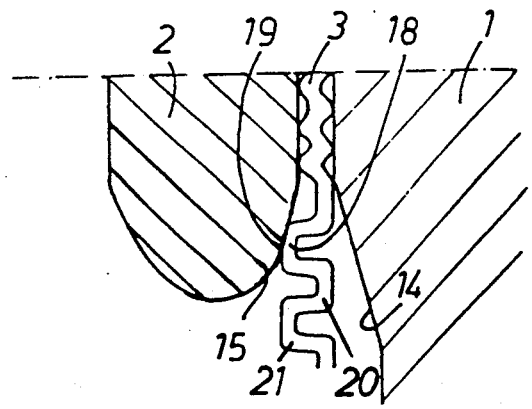
FIGS. 6-8 are schematic views, on an enlarged scale, respectively illustrating a basic position and two deflected positions of a membrane constructed in accordance with the present invention.

As shown most clearly in FIG. 6, an outer wave crest 18 is entirely enclosed between the two contact surfaces 14, 15, with the outer wave crest 18 projecting with a back surface 19 into a flaring space formed by the contact surface 15 on the frame side. In FIG. 6, the back surface 19 is in direct contact with the contact surface 15 in the basic position. Alternatively, the back surface 19 may be arranged so as to have a tolerance distance from the contact surface 15. A height of the undulations in the undulation zone 16 is almost twice as large as a thickness of the clamping ring 9 of the membrane 3 and approximately as large as a thickness of the membrane 3 in a central zone provided with the filtrate discharge nubs 17. Undulation or wave crests 20 (FIGS. 1 and 6) facing the supporting plate 1 lie approximately in a plane of the clamping surface 13 (FIG. 4) of the membrane 3 on the side of the supporting plate 1, and the undulation or wave crests 21 (FIGS. 1, 3, 6, 7) facing the frame 2 project by one-third to one-half of a thickness of the membrane clamping rim 9 beyond the clamping surface 12 (FIG. 4) of the membrane 3 on the frame side. The undulation in the undulation zone 16 may, for example, be sinusoidal as shown most clearly in FIG. 4 or rectangular as shown most clearly in FIG. 6.

Figure 5:
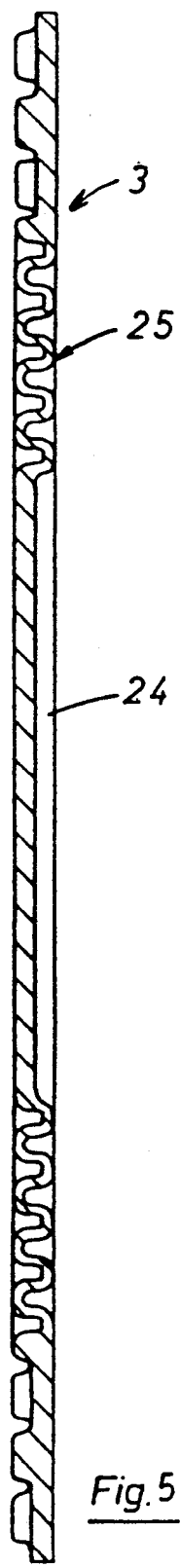
FIG. 5 is a cross-sectional view taken along the line of V—V in FIG. 2.

As shown in FIG. 2, with rectangular membrane plates, the membrane 3, in an area of the corners thereof, is provided with a substantially larger number of undulations or waves 22, with the number of undulations or waves decreasing in a step wise manner toward a lateral center of the membrane 3. In the illustrated embodiment of FIG. 2, the membrane 3 is suitable for a filter press wherein in a slurry feed and/or filtrate discharge and/or press medium supply are conducted through channels formed in the clamping rim of the filter plate pack so that the membrane 3 is provided with suitable perforations 23 in an area of the clamping rim 9. With larger supporting plates including supporting nubs on surfaces thereof, the membrane 3 is also provided with an undulation or wavy zone 25 all around the supporting nub contacting surfaces 24 (FIGS. 2, 5).

With a filter press having a central slurry feed, a membrane (not shown) may be provided with a central perforation and clamped in place in a conventional manner by flanges at the supporting plate. In accordance with the present invention, a membrane of such type would also be provided, at its clamping rim gripped or seized by the flanges, with grooves 10 and sealing lips 11 and, around the clamping zone, an undulated or wavy zone would be arranged in a manner analogous to the undulated zones or regions 16, 25, respectively.

As shown in FIG. 3, the undulation or wave crests 21 are respectively interrupted at several points along a periphery of the membrane 3 by thin membrane zones 26 which are substantially flat for enabling a discharge of filtrate.

Figure 7:
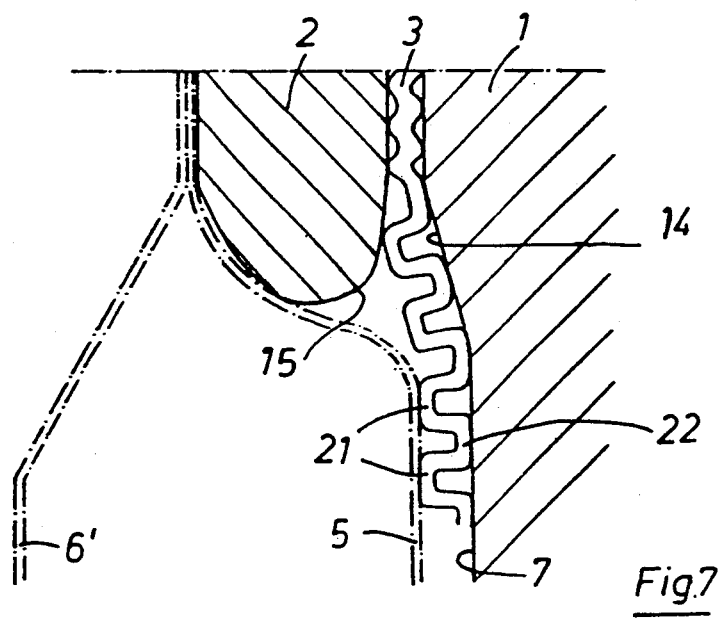
Figure 8:
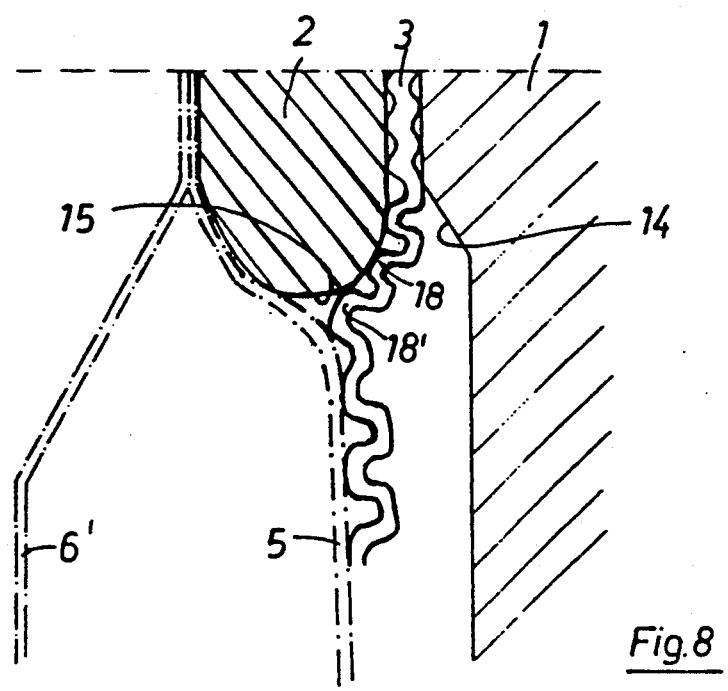

FIGS. 6–8 schematically illustrate the stress on the membrane 3, which is minor as far as force is concerned, during a deflection movement of the membrane 3. While the filtration step is taking place, the filtering material is introduced under high pressure into the filter cake chamber defined by two neighboring filter cloths 5, 6' (FIGS. 7 and 8), with the filter cloth 5 coming into contact with the undulation or wave crests 21 of the membrane 3, and the rearward undulation or wave crests 20 being deflected by the filter cloth 5 so as to contact the contact surface 14 and the panel surface of the supporting plate 1. In the illustrated deflection effected by the filtration pressure, no local peak loads are exerted on the membrane 3 in a region of the gusset base formed by the contact surfaces 14, 15.

During a particularly critical deflection of the membrane 3 by the press pressure exerted on a rear face for the purpose of pressing the filter cake, the two outer undulation or wave crests 18, 18' (FIG. 8) impinge, after a relatively short deflection path, with back surfaces thereof onto the contact surface 15 of the frame 2. With such a deflection, the bending stress is distributed over a relatively large undulation or wave area and, in the gusset base formed by the contact surfaces 14, 15, only relatively small bending forces are exerted on the membrane 3.

In the embodiment illustrated in FIGS. 9–11, wave crests 27 symmetrically project beyond both sides of a central plane M of a membrane 29 including a clamping rim generally designated by the reference numeral 28. The clamping rim 28 includes a flat membrane strip provided at both clamping surfaces generally designated by the reference numerals 30, 31 with mutually opposed sealing lips 32.

As shown in FIG. 10, a thickness D of the clamping rim 28 of the membrane 29 is larger by about one and a half times a thickness d of the membrane 29 in the undulation or wavy zone 33. The clamping rim 28 is provided on an outer edge thereof with a continuously extending outer bead 34 (FIG. 9), with a width of the outer bead 34 being approximately equal to a wave height H of the undulation or wavy zone 33. Nubs 35, oriented or extending toward the filter cake chamber, project beyond the crests 27 of the undulations or waves of the wavy zone 33 oriented toward this side.

While I have shown and described only one embodiment in accordance with the present invention, it is understood that the same is not limited thereto but is susceptible to numerous and modifications as known to one of ordinary skill in the art, and I therefore do not wish to be limited to the details shown and described herein, but intend to cover all such modifications as are encompassed by the scope of the appended claims.

I claim:

1. A membrane plate for filter presses, the membrane plate comprising a supporting plate, a frame, and an elastically deflectable membrane clamped in place between said supporting plate and said frame, said membrane including a clamping rim enclosed between two approximately V-shaped diverging contact surfaces of said supporting plate and said frame and inclined with respect to each other at an acute angle, wherein said membrane is provided inwardly of said clamping rim with an undulated zone wherein the flexible membrane is folded back and forth in a corrugated fashion with crests of undulations which extend in parallel to the clamping rim, and wherein at least one outer crest is enclosed between the two contact surfaces and projects with a back portion thereof into a flaring space defined by one of the contact surfaces lying in opposition to a press medium chamber of the filter press, said undulated zone of the flexible membrane being positioned in said membrane plate in a basic position such the membrane can be deflected under pressure from the basic position in a first direction toward the press medium chamber of the filter press and can be deflected under pressure from the basic position in a second direction opposite said first direction.

2. A membrane plate according to claim 1, wherein said back portion of said outer wave crest is in contact with said one contact surface.

3. A membrane plate for filter presses, the membrane plate comprising a supporting plate, a frame, and an elastically deflectable membrane clamped in place between said supporting plate and said frame, said membrane including a clamping rim enclosed between two approximately V-shaped diverging contact surfaces of said supporting plate and said frame and inclined with respect to each other at an acute angle, wherein said membrane is provided inwardly of said clamping rim with an undulated zone wherein crests of the undulations extend in parallel to the clamping rim, and wherein at least one outer crest is enclosed between the two contact surfaces and projects with a back portion thereof into a flaring space defined by one of the contact surfaces lying in opposition to a press medium chamber of the filter press, wherein said back portion of said outer wave crest is in contact with said one contact surface, and wherein a height of the undulations is larger than a thickness of the clamping rim of the membrane.

4. A membrane plate according to claim 3, wherein said membrane is fashioned of polypropylene and has a Shore hardness of 73.

5. A membrane plate for filter presses, the membrane plate comprising a supporting plate, a frame, and an electrically deflectable membrane clamped in place between said supporting plate and said frame, said membrane including a clamping rim enclosed between two approximately V-shaped diverging contact surfaces of said supporting plate and said frame and inclined with respect to each other at an acute angle, wherein said membrane is provided inwardly of said clamping rim with an undulated zone wherein crests of the undulations extend in parallel to the clamping rim, and wherein at least one outer crest is enclosed between the two contact surfaces and projects with a back portion thereof into a flaring space defined by one of the contact surfaces lying in opposition to a press medium chamber of the filter press, wherein a height of the undulations is approximately equal to a thickness of the membrane in a central zone thereof.

6. A membrane plate according to claim 5, wherein the central zone is provided with nub means for enabling a discharge of filtrate.

7. A membrane plate according to claim 6, wherein said membrane is fashioned of polypropylene and has a Shore hardness of 73.

8. A membrane plate for filter presses, the membrane plate comprising a supporting plate, a frame, and an elastically deflectable membrane clamped in place between said supporting plate and said frame, said membrane including a clamping rim enclosed between two approximately V-shaped diverging contact surfaces of said supporting plate and said frame and inclined with respect to each other at an acute angle, wherein said membrane is provided inwardly of said clamping rim with an undulated zone wherein crests of the undulations extend in parallel to the clamping rim, and wherein at least one outer crest is enclosed between the two contact surfaces and projects with a back portion thereof into a flaring space defined by one of the contact surfaces lying in opposition to a press medium chamber of the filter press, wherein crests of undulations facing the supporting plate lie in a plane of a clamping surface of the membrane on a side of the supporting plate, and crests of the undulations facing the frame project by a distance of between one-third to one-half a thickness of the clamping rim beyond a clamping surface of the membrane on a side of the frame.

9. A membrane plate according to claim 8, wherein the undulation is sinusoidal.

10. A membrane plate according to claim 9, wherein said membrane is fashioned of polypropylene and has a Shore hardness of 73.

11. A membrane plate according to claim 8, wherein the undulation is substantially rectangular.

12. A membrane plate according to claim 11, wherein said membrane is fashioned of polypropylene and has a Shore hardness of 73.

13. A membrane plate according to one of claims 1 or 2, wherein the supporting plate includes supporting nubs on a surface thereof facing the membrane, and wherein the membrane is provided with undulated zones inwardly of a supporting nub contact surface thereof.

14. A membrane plate according to claim 13, wherein said membrane is fashioned of polypropylene and has a Shore hardness of 73.

15. A membrane plate according to one of claims 1 or 2, wherein crests of the undulations are respectively interrupted at a plurality of peripheral areas of the membrane by substantially flat thin membrane zones for enabling a discharge of filtrate.

16. A membrane plate according to claim 14, wherein said membrane is fashioned of polypropylene and has a Shore hardness of 73.

17. A membrane plate for filter presses, the membrane plate comprising a supporting plate, a frame, and an elastically deflectable membrane clamped in place between said supporting plate and said frame, said membrane including a clamping rim enclosed between two approximately V-shaped diverging contact surfaces of said supporting plate and said frame and inclined with respect to each other at an acute angle, wherein said membrane is provided inwardly of said clamping rim with an undulated zone wherein crests of the undulations extend in parallel to the clamping rim, and wherein at least one outer crest is enclosed between the two contact surfaces and projects with a back portion thereof into a flaring space defined by one of the contact surfaces lying in opposition to a press medium chamber of the filter press, wherein the membrane is provided on an opposite side of the clamping rim with peripheral grooves separated from one another by narrow sealing lips.

18. A membrane plate according to claim 17, wherein the sealing lips at the respective opposite sides of the membrane are in each case mutually offset in a staggered fashion.

19. A membrane plate according to claim 18, wherein said membrane is fashioned of polypropylene and has a Shore hardness of 73.

20. A membrane plate for filter presses, the membrane plate comprising a supporting plate, a frame, and an elastically deflectable membrane clamped in place between said supporting plate and said frame, said membrane including a clamping rim enclosed between two approximately V-shaped diverging contact surfaces of said supporting plate and said frame and inclined with respect to each other at an acute angle, wherein said membrane is provided inwardly of said clamping rim with an undulated zone wherein crests of the undulations extend in parallel to the clamping rim, and wherein at least one outer crest is enclosed between the two contact surfaces and projects with a back portion thereof into a flaring space defined by one of the contact surfaces lying in opposition to a press medium chamber of the filter press, wherein the membrane plate has a rectangular configuration, and wherein, in corner regions of the membrane, a larger number of undulations are provided, with the number of undulations decreasing in a step wise manner in a direction toward a lateral center portion of the membrane.

21. A membrane plate for filter presses, the membrane plate comprising a supporting plate, a frame, and an elastically deflectable membrane clamped in place between said supporting plate and said frame, said membrane including a clamping rim enclosed between two approximately V-shaped diverging contact surfaces of said supporting plate and said frame and inclined with respect to each other at an acute angle, wherein said membrane is provided inwardly of said clamping rim with an undulated zone wherein crests of the undulations extend in parallel to the clamping rim, and wherein at least one outer crest is enclosed between the two contact surfaces and projects with a back portion thereof into a flaring space defined by one of the contact surfaces lying in opposition to a press medium chamber of the filter press, wherein crests of the undulations project on opposite sides of the membrane symmetrically past a central plane of the membrane defined by the clamping rim.

22. A membrane plate according to claim 21, wherein a thickness of the membrane at the clamping rim is larger by about one and a half times a material thickness of the membrane in the zone of undulations.

23. A membrane plate according to claim 21, wherein the clamping rim includes a flat membrane strip provided on both clamping surfaces with mutually opposed sealing lips.

24. A membrane plate according to claim 21, wherein the clamping rim is provided with a continuously extending outer bead, and wherein a width of the outer bead is approximately equal to a height of a zone of the undulations.

* * * * *